Apr. 17, 1923. Re. 15,581

O. W. BRENIZER

CABLE SUPPORT

Original Filed Dec. 29, 1920

INVENTOR:-
ORSON W. BRENIZER,
by A. V. Grouff
ATTORNEY.

Reissued Apr. 17, 1923. Re. 15,581

UNITED STATES PATENT OFFICE.

ORSON W. BRENIZER, OF PHILADELPHIA, PENNSYLVANIA, ASSIGNOR OF ONE-FIFTH TO ANDREW V. GROUPE, OF PHILADELPHIA, PENNSYLVANIA.

CABLE SUPPORT.

Original No. 1,373,166, dated March 29, 1921, Serial No. 433,758, filed December 29, 1920. Application for reissue filed January 13, 1923. Serial No. 612,555.

*To all whom it may concern:*

Be it known that I, ORSON W. BRENIZER, a citizen of the United States, residing at Philadelphia, in the county of Philadelphia and State of Pennsylvania, have invented certain new and useful Improvements in Cable Supports, of which the following is a specification.

This invention relates to improvements in cable supports adapted to be hung at intervals upon a supporting or messenger wire to receive and support a cable therein, the messenger wire being formed of a plurality of strands twisted around a central or core strand and providing the messenger wire with relatively large and small diameters in alternate succession, forming intermediate shoulder portions.

The object of the invention is to provide a cable support of novel, simple and efficient construction which may be formed of a single piece of spring wire and which has provision: first, whereby shoulder portions of the messenger wire may be utilized to prevent displacement of the cable support longitudinally thereof in a construction employing hooks to attach the support to the messenger wire, without requiring a spring pressed gripping of the hooks against the messenger wire to prevent the hooks from leaving it while a cable is being drawn through the support; second, whereby the cable support may be constructed of a relatively short length of wire and possess many advantages in its co-operation with the messenger wire to prevent displacement thereon not possessed by prior constructions which do not require a greater length of wire, thereby resulting in a great saving of material in wire cable supports now in general use; and, third, whereby many advantageous results are attained.

The invention consists in the novel construction, combination and arrangement of parts hereinafter described and claimed.

In the accompanying drawings, illustrating my invention,

Figure 2:
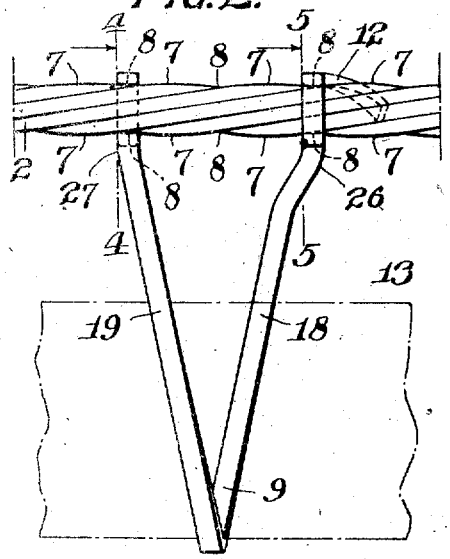
Figure 2 is a side view thereof.
Figure 4:
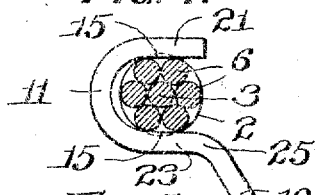
Figure 3:
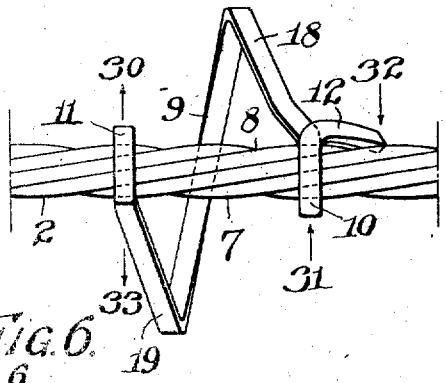
Figure 3 is a top view thereof.
Figure 5:
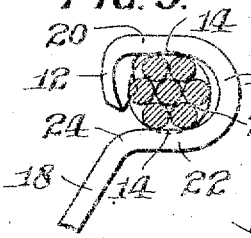

Figures 4 and 5 are enlarged, transverse sections of the messenger wire, on lines 4—4 and 5—5, respectively, of Fig. 2, showing the two cable hanger hooks applied thereto.

Figure 6:
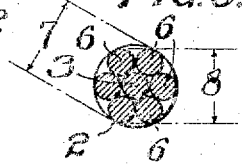

Figure 6 is an enlarged transverse section of the messenger wire.

Referring to the drawings, 2 designates the supporting or messenger wire which comprises a central or core strand 3 and six outer strands 6 lying side by side and twisted in spiral form around the core strand 3, as clearly shown in the drawings. A messenger wire of this character has relatively large and small diameters, which occur in alternate succession longitudinally of the wire, as indicated at 7 and 8, respectively, in Fig. 2, and which extend continuously, in spiral form around the wire 2 from end to end thereof, following the lines of its twisted strands 6. These alternating large and small diameters are also indicated at 7 and 8, in Fig. 6, where it will be observed that each of two parallel lines which touch opposite sides of the wire 2 at one of the small diameters 8 thereof also touch two of its twisted strands 6.

The cable support is formed of a single piece of wire which is flat in cross section, and it comprises a cable-receiving loop 9 extending beneath the supporting or messenger wire, obliquely extending arms or end portions 18 and 19 diverging upwardly from the respective sides of the loop 9, hooks 10 and 11 extending upwardly from the upper ends of the arms 18 and 19, and an arm 12 extending from the hook 10.

Figure 1:
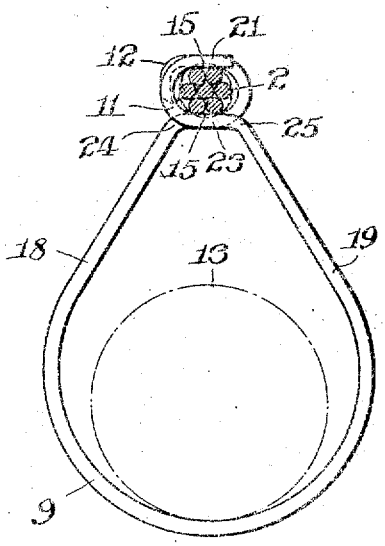
Figure 1 is a transverse section through a supporting or messenger wire having a cable support applied thereto embodying my invention.

The hooks 10 and 11 are hooked around and over the supporting wire 2 from opposite sides thereof to connect the cable support thereto in a manner to permit it to act as a support for suspending a cable, indicated at 13 in Figs. 1 and 2, from the supporting wire 2.

The loop 9 is formed by a flatwise bend in the wire forming the support and it extends transversely of the supporting wire 2 for the reception of the cable 13, and the diverging side arms 18 and 19 of the loop 9 space the hooks 10 and 11 longitudinally of the supporting wire 2.

The hooks 10 and 11 are set in parallel relationship, or substantially so, and to extend at right angles to the supporting wire 2, or substantially so, so that the upper parts 20 and 21 of the hooks 10 and 11 will occupy positions over the lower parts 22 and 23 thereof, respectively. The hooks 10 and 11 are formed by flatwise bends in the wire forming the support and the bottom parts 22 and 23 thereof are connected to the arms 18 and 19 by flatwise bends 24 and 25 and edgewise bends 26 and 27, respectively, in the wire.

The arm 12 extends from the free end of the top part 20 of the hook 10 in the direction of the length of the supporting wire 2, and it is connected to the part 20 by an edgewise bend 28 in the wire forming the support. The arm 12 extends downwardly below the plane of the top of the supporting wire 2 to engage the wire 2 on the opposite side thereof to the side occupied by the curved portion of the hook 10 or the side around which the hook 10 extends.

In applying the hook 10 to the wire 2, the cable support is turned and manipulated to pass the arm 12 over the wire 2 in advance of the hook 10, and, thereafter, the hook 10 is engaged with the wire 2. The hook 10 fits the wire 2 sufficiently loose to allow it to be rocked enough to permit the hook 11 to move under the wire 2 while the hook 10 is being applied thereto. During and after the application of the hook 10 to the wire 2, the hook 11 is moved beneath the wire 2 in the direction of the arrow 30 by springing the loop or body 9 of the support until the free end of the hook 11 clears the side of the wire 2 on which the arrow 30 is located; whereupon the hook 11 is raised and engaged with the wire 2, as illustrated in the drawings, while the loop or body portion 9 of the support is permitted to spring back to or toward its normal condition. When the hook 11 is thus applied to the wire 2, the loop 9 is sprung in opposition to pressure of the hook 10, in the direction of the arrow 31, against the wire 2 and in opposition to pressure of the free end of the arm 12, in the direction of the arrow 32, against the wire 2.

The cable support may be removed from the wire 2, when desired, by a reversal of the operation just described for its application thereto.

One or more parts of the cable support are retained within the space between two adjacent large diameters 7 of the supporting wire 2 by the engagement of the hook 11 with the wire 2 at one side thereof and the engagement of the hook 10 and arm 12 with the wire 2 at the opposite side thereof. As herein illustrated, the parts of the cable support, each of which are thus held between two adjacent large diameters 7, are the parts 20, 21, 22 and 23 and the arm 12, the distance between the upper and lower surfaces of the parts 20 and 22 and the upper and lower surfaces of the parts 21 and 23, respectively, being each less than the large diameter 7 of the supporting wire 2 and the hooks 10 and 11 each being hooked around the supporting wire 2 above and below one of the small diameters thereof.

It will now be understood that, when the cable support is applied to the supporting wire 2 therefor, and a cable is drawn through the loop 9 in either direction, the arm 12 engaging one side of the wire 2 will prevent the hook 10 from being accidentally disengaged from or leaving the wire 2 while the hook 11 is engaged therewith, and that the hook 10 and arm 12 will co-operate to prevent the hook 11 from being accidentally disengaged from the wire 2, by requiring the loop 9 to be sprung from the condition shown in the drawings for such disengagement.

When a cable is drawn through the loop 9 of the support, in either direction, any tendency to move the cable support with it relatively to the supporting wire 2 will cause one or more of the parts 20, 21, 22, 23 and 12 to engage one or more of the shoulders formed between the large and small diameters 7 and 8, respectively, of the supporting wire 2 adjacent thereto and prevent the support from moving with the cable 13; and, thereafter the further tendency of the cable 13 to move the cable support will tend to cant the hooks 10 and 11 and thereby press the upper and lower parts thereof into firm gripping engagement with the upper and lower parts, respectively, of the supporting wire 2, the gripping action thus effected increasing in power as the tendency of the cable to move the cable support increases in power.

The relation of the parts of the cable support to each other before and after the support is applied to the supporting wire 2 may be such that more or less pressure is exerted against the supporting wire 2 by the hooks 10 and 11 and arm 12 in the directions of the arrows 30, 31 and 33, respectively, as the cable support tends to resume a normal condition after being applied to the supporting wire 2; and, while such pressure is desirable to avoid fine fitting and to hold the parts of the cable support firmly in place upon the supporting wire and in constant readiness to perform their functions, it is not necessary in the actual work of the parts either to retain the hooks 10 and 11 upon the supporting wire 2 or to prevent the cable support from being moved along the supporting wire 2 with the cable when the cable is drawn through the loop 9 of the support in either direction.

I claim as my invention:—

1. The combination with a supporting wire having relatively large and small diameters in alternate succession, of a cable support comprising a cable receiving loop extending beneath the supporting wire, a hook on one end portion of said loop engaged with said wire, and a hook on the other end portion of said loop and engaged with said wire and extending around one side thereof and having an arm extending therefrom in the direction of the length of said wire and adapted to engage the opposite side thereof to prevent the accidental disengagement of said hooks from the supporting wire, each of said hooks engaging the top and bottom of the supporting wire, one of said hooks having two opposing faces adjacent to two opposite sides of the supporting wire at one of its small diameters, the distance between said faces being less than the adjacent large diameter of the supporting wire, whereby displacement of the cable support longitudinally of the supporting wire is prevented without the aid of any spring pressed gripping action of the cable support upon the supporting wire.

2. The combination with a supporting wire formed of twisted strands providing relatively large and small diameters in alternate succession longitudinally of the wire, of a cable support formed of a single piece of spring wire and comprising a cable receiving loop extending transversely beneath the supporting wire and having end portions spaced longitudinally of the supporting wire and provided with oppositely opening hooks extending upwardly therefrom and hooked around the supporting wire from opposite sides thereof, each hook having a bottom part extending under the supporting wire, each hook having a top part extending over the bottom part thereof and over the supporting wire, the top and bottom part of each hook being in a plane normal to the axis of the supporting wire, and an arm extending from the free end portion of the upper part of one of said hooks in the direction of the supporting wire and away from the other of said hooks and downwardly to and terminating at the side of the messenger wire opposite to the side thereof around which the hook carrying the arm extends, said hook and said arm being adapted by their engagement with the supporting wire to retain said hooks upon the same and to retain a part of the cable support in engagement with the supporting wire between two of the large diameters thereof.

3. A cable support formed of a single piece of spring wire and adapted to be applied to a supporting wire of the character described and comprising a cable receiving loop adapted to extend transversely beneath the supporting wire, obliquely extending arms diverging upwardly from the respective sides of the loop, oppositely opening hooks extending upwardly from the upper ends of the arms and adapted to be hooked around the supporting wire from opposite sides thereof, each hook having a top part and a bottom part arranged one above the other and adapted to extend over and under the supporting wire, respectively, in a plane normal to the axis of the supporting wire when the cable support is applied thereto, the bottom parts of said hooks extending at obtuse angles to said arms and being connected thereto by abrupt bends in the wire forming the support, an arm extending laterally and downwardly from the free end of the top part of one of said hooks and in a direction away from the other hook and adapted to engage one side of the supporting wire and to co-operate with said hooks to retain a part of the cable support in engagement with the supporting wire between two of the large diameters thereof when the cable support is applied thereto.

4. A cable support formed of a single piece of flat spring wire and adapted to be applied to a supporting wire and comprising a cable receiving loop formed by a flatwise bend in the wire and having upwardly diverging arms extending from the respective sides of the loop, oppositely opening hooks formed by flatwise bends in the wire and extending upwardly from the upper ends of said arms and connected thereto by flatwise and edgewise bends in the wire and adapted to be hooked around a supporting wire from opposite sides thereof, each hook having a top part and a bottom part arranged one above the other to extend over and under a supporting wire, respectively, in a plane normal to the axis of the supporting wire when the cable support is applied thereto, and an arm connected by an edgewise bend in the wire to the free upper end portion of one of said hooks and extending laterally and downwardly therefrom in a direction away from the other of said hooks.

In testimony whereof I affix my signature hereto.

ORSON W. BRENIZER.